Figure 1:
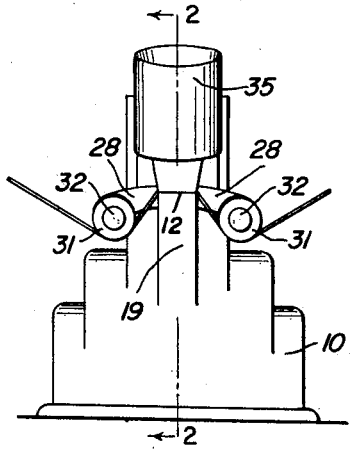

Feb. 2, 1960 K. O. RASMUSSEN 2,923,199
MECHANISM FOR ADVANCING MOTION PICTURE FILM INTERMITTENTLY
Filed March 24, 1955 2 Sheets-Sheet 1

Inventor
KEITH O. RASMUSSEN

By
Attorneys

Feb. 2, 1960 K. O. RASMUSSEN 2,923,199
MECHANISM FOR ADVANCING MOTION PICTURE FILM INTERMITTENTLY
Filed March 24, 1955 2 Sheets-Sheet 2
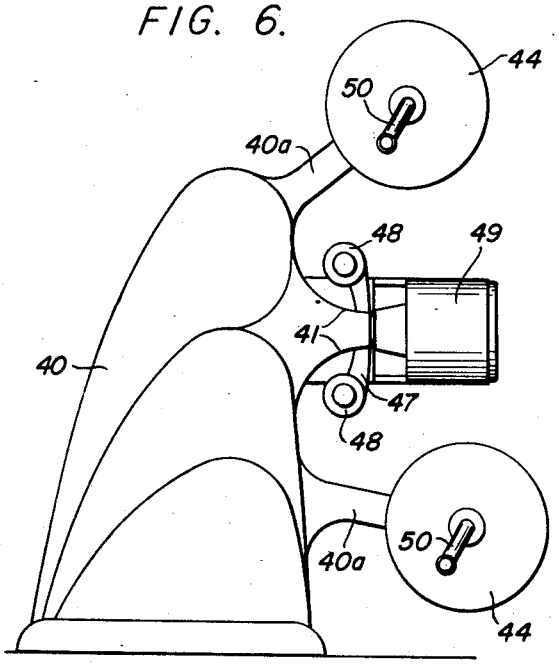
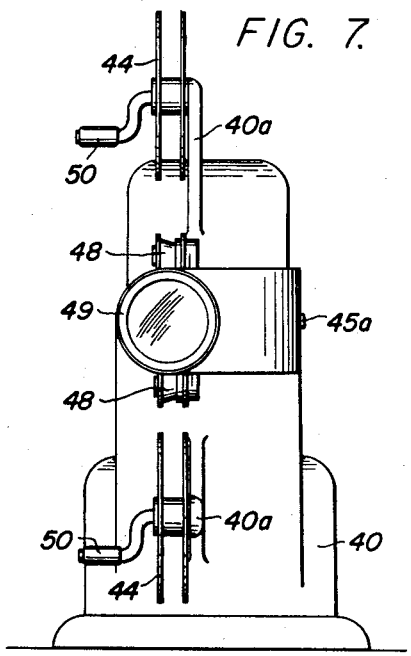
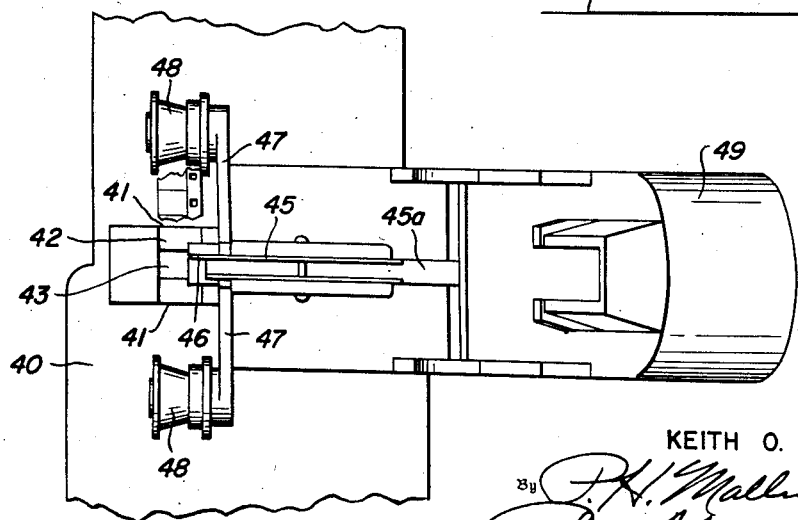
Inventor
KEITH O. RASMUSSEN
Attorneys

United States Patent Office 2,923,199
Patented Feb. 2, 1960

2,923,199

MECHANISM FOR ADVANCING MOTION PICTURE FILM INTERMITTENTLY

Keith O. Rasmussen, San Francisco, Calif.

Application March 24, 1955, Serial No. 496,482

4 Claims. (Cl. 88—18)

This invention relates to mechanism useful in motion picture editors, viewers, projectors, and similar devices, for advancing the film across an aperture intermittently, from frame to frame.

The illusion of motion in the viewing of motion pictures, whether they be projected on a screen or observed in some other manner, depends upon momentarily halting each of the successive views or frames of the film at a framing aperture while the film is otherwise passed very rapidly across the aperture.

Mechanism for accomplishing the required intermittent advance of the film across the framing aperture has been largely of complicated character, designed for positive and precise operation with expensive projection apparatus. Very little has so far been accomplished in the way of positive and precise, yet simple and inexpensive mechanism for film editors and viewers designed to satisfy popular demand at the amateur level and for projectors falling into the category of a toy.

The present invention has for its principal purpose the provision of mechanism of such character, which may be easily and economically mass produced from a variety of different materials commonly employed in industry, particularly thermoplastic synthetic resins and the like.

One important object of the invention is to provide a mechanism of the type concerned that will operate in whatever direction the film may be moved, either forwardly or backwardly, thereby adapting the same mechanism for use in an editor, viewer, or projector, at the choice of a manufacturer.

Another is to insure positivity and preciseness of operation over an exceptionally long working life with mechanism having an exceptionally simple and trouble-free construction.

It is also an object to provide for free continuous movement of the film in either direction when desired and for ease in inserting and removing the film.

Another object is to enable the handling of most of the standard sizes and types of motion picture film without essential alteration of the structural components.

A feature of mechanism conforming to the invention is the provision of a spring-loaded detent operable with respect to the marginal perforations of standard motion picture film, to normally prevent longitudinal movement of such film, and of means actuated by the film itself for intermittently moving the detent away from the film upon the exercise of longitudinal pulling tension upon such film.

Further objects and features of the invention will become apparent from the detailed description of the particular preferred embodiments of the invention illustrated in the accompanying drawings.

Figure 2:
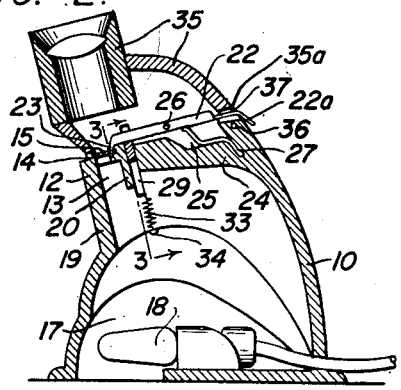
Figure 4:
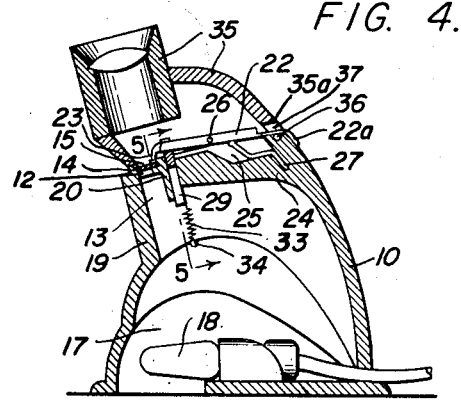
Figure 3:
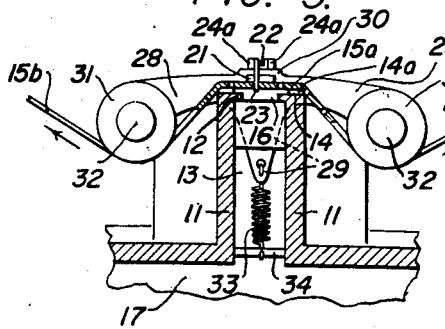
Figure 5:
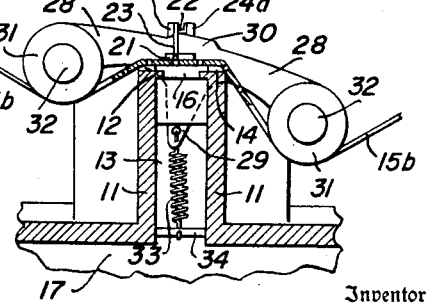

In the drawings:

Fig. 1 represents a front elevation of a motion picture editing device embodying a preferred form of the mechanism of the invention;

Fig. 2, a vertical section taken on the line 2—2 of Fig. 1, the detent being shown in its film-engaging position;

Fig. 3, a fragmentary vertical section taken on the line 3—3 of Fig. 2 and drawn to an enlarged scale;

Fig. 4, a view corresponding to that of Fig. 2, but showing the detent out of film-engaging position;

Fig. 5, a view corresponding to Fig. 3, but taken on the line 5—5 of Fig. 4;

Fig. 6, a side elevation of a motion picture film projector embodying the same mechanism as the film editing device of the preceding figures;

Fig. 7, a front elevation; and

Fig. 8, a fragmentary front elevation corresponding to the film handling, midportion of Fig. 7, but drawn to an enlarged scale and showing the lens assembly swung back to reveal the mechanism of the invention in what would be a top plan view if taken from the standpoint of the film editing device of Figs. 3 and 5.

Referring to the drawings:

In Figs. 1 through 5 the mechanism of the invention is illustrated as forming a part of a motion picture film editor, while in Figs. 6, 7, and 8 the same mechanism is illustrated as forming a part of a toy projector for motion picture films. These adaptations of the mechanism of the invention are indicative of the various ways in which it may be utilized in connection with devices or apparatus pertaining to the showing of motion pictures from one standpoint or another.

The editor of Figs. 1 through 5 is capable of mass production at very low cost compared to apparatus currently available for the purpose. As illustrated, it handles the standard 8 millimeter motion picture film, but mere changes in dimension will enable the same mechanism to handle any standard motion picture film having one marginal sprocket hole per picture frame.

In the particular form illustrated, which may be regarded as typical of preferred constructions, an ornamental housing 10 is formed in any suitable manner, preferably by injection molding or some other standard technique utilizing a suitable thermoplastic material. It includes upstanding and mutually spaced wall portions 11, Figs. 3 and 5, disposed in face-to-face opposition, and a wall portion 12 spanning their upper ends to provide a covered shaft 13 for light-conducting purposes and a trackway surface 14 for traversal by motion picture film 15.

A framing aperture 16 is provided in the wall portion 12 intermediate the trackway surface 14. The shaft 13 extends downwardly into communication with an illumination chamber 17 containing a light source, for example, an electric light 18. The shaft 13 is closed forwardly by a wall portion 19, Fig. 1, and rearwardly by a wall portion 20.

The trackway or film-receiving surface 14 includes a relatively narrow track portion 14a, raised with respect to the other parts of the surface, for supporting the usual perforated margin 15a of the film. Such trackway is interrupted by a rearward extension of the framing aperture 16 to provide for accommodating a detent finger described hereinafter, and an overhanging guide 21 for both the film and the detent finger is preferably also provided.

It is the purpose of the invention to provide for longitudinal, intermittent movement of the motion picture film 15 along the trackway surface 14 from one side of the device to the other, so that the illusion of motion is imparted to a viewer in the same manner as with the customary projection of motion pictures. To this end, a detent-carrying lever 22 is fulcrumed intermediate its length and is resiliently biased, so that a detent finger 23 which depends from its forward end immediately above the track 14a, is normally urged toward the trackway surface 14 for successively engaging the perforations in the margin 15a of the film and for normally restraining the longitudinal movement of the film along the trackway surface.

As illustrated, the housing 10 is provided with a transversely extending wall portion 24 having a spring and lever accommodating recess 25 formed in its upper surface and upstanding elongate members 24a, Figs. 3 and 5, extending from front to back longitudinally of and at respectively opposite sides of such recess 25. A pivot pin 26 journals and fulcrums the lever 22 in and between such upstanding wall members 24a. A spring 27, here shown as a leaf spring, is positioned in the recess 25 for resiliently biasing the lever and normally urging its forward end toward the trackway surface 14 and its detent finger 23 through a marginal perforation of the film, see Fig. 2.

In order that the film be movable longitudinally of the trackway surface, it is necessary that the detent finger 23 be raised out of engagement with the film; and, in order that such movement of the film be intermittent in character, it is necessary that the detent finger be raised and be permitted to drop, alternately, from perforation to perforation in the series of marginal perforations in the film.

For this purpose, the present invention provides film-operated mechanism for moving the detent finger away from the surface upon the exercise of longitudinal pulling tension upon the film. In this connection, it should be realized that the film may be pulled through the device by either manually grasping and pulling it, following proper insertion of same in the device, or by rotating a reel on which an advance portion of the length of film is wound. It is customary to utilize a rotatably mounted reel at opposite lateral sides of a film editing device, rotating either one or the other of the reels depending upon which direction the film is to be moved, and it is to be understood that such auxiliary equipment may be used in connection with the present device even though it is not here illustrated.

It is preferred that the film-operated mechanism mentioned above take the form of a rocker arm rockably mounted adjacent the detent-mounting lever for abutting engagement therewith when rocked by reason of film tension acting against film-guiding means carried by the rocker arm remote from its mounting.

In the form illustrated, a rocker arm assembly extends transversely across the spaced wall portions 11, and comprises a pair of similar but oppositely extending rocker arms 28, respectively, and a stem 29 intermediate thereof and rigid therewith. The rocker arms rest directly upon the upper ends of the respective walls 11, and the stem depends into the space between such walls. The two rocker arms and the stem are advantageously molded as an integral unit from thermoplastic material. A boss 30 is also advantageously included as an integral part of the assembly, in a position between and rising upwardly from the rocker arms and immediately above the stem 29. Film-guiding spools 31 are rotatably mounted on stub shafts 32, which project rigidly from the terminal ends of the respective rocker arms.

The rocker arm assembly as thus constituted is snugly fitted between the forward arm of the lever 22 and the upper ends of the wall portions 11, rearwardly of the top wall 12, so that film tension exerted upwardly on either one or the other of the spools 31 rocks such assembly on its supporting wall portion 11 and raises such forward arm of the lever 22 against the downward urge exerted with respect to it by the spring 27.

To provide yieldable and resilient reaction against such rocking movement of the rocker assembly, a spring 33 is anchored between the lower end of the stem 29 and a crossbar 34. Thus, the detent and the rocker arm assembly are resiliently biased in the same direction, i.e. downwardly with respect to the trackway surface 14.

In operation, considering now the mechanism from the standpoint of Figs. 3 and 5, pull exerted on either of the oppositely extending lateral portions 15b of the film 15 in the direction of the appended arrow will exert tension on such film portion, between the lowered and film-engaging detent finger 23 and the corresponding guide spool 31, thereby raising such guide spool 31 against the urge of spring 33, see Fig. 5, and rocking the entire rocker arm assembly to raise the corresponding side of the boss 30, which, in turn, raises the forward arm of lever 22 for disengaging detent finger 23 from the film.

This permits the film strip 15 to move in the direction of pull, but, almost instantaneously, the resulting relinquishment of tension on the film enables the springs 33 and 27 to return the rocker arm to the normal position of Fig. 3 and the detent finger 23 to drop into the next perforation of the film.

This cycle of action is repeated rapidly and sequentially with respect to the series of perforations in the film, resulting in the intermittent travel of the film necessary for the illusion of motion.

For film viewing purposes during the intermittent travel of motion picture film 15, a lens assembly 35 is hinged to the housing 10 in any suitable manner, as, for example, by means of a pin 36 and spaced depending ears (see 37, Figs. 2 and 4) of the lens housing. Such lens assembly is swung backwardly out of the way when inserting film in the device or inspecting the film-moving mechanism.

For the purpose of facilitating insertion of the film in the device, it is desirable that the lever 22 be provided with a tail 22a extending backwardly between the ears 37 of lens assembly 35. The space between such ears is sufficiently deep that, in the normal viewing position shown, the tail is freely accommodated. However, when the lens assembly is swung backwardly with respect to the housing 10 (this position illustrated only for the embodiment of Figs. 6, 7, and 8, see Fig. 8), the rearward edge 35a of that portion of the lens housing disposed between the ears abuts against and depresses the tail portion 22a of lever 22, thereby raising the forward arm of such lever and lifting detent finger 23 free and clear of the film track. This enables the film to be easily positioned on the trackway surface 14. Thereafter, when the lens assembly is swung back into the viewing position illustrated, spring 27 causes lever 22 to resume its normal film-engaging position of Fig. 2.

In Figs. 6, 7, and 8, the mechanism of the invention is illustrated as incorporated in a toy motion picture projector.

Because the mechanism may be produced at exceptionally low cost, it makes possible a motion picture projector falling into the category of a toy. Withal, operation is precise and positive.

As illustrated, a projector housing 40 is formed of any suitable material and of any desired ornamental configuration. As in the instance of the editing device, such housing is preferably molded from a thermoplastic material.

Reel-holding arms 40a are advantageously molded integrally with the housing 40, as are rocker arm supporting walls 41, corresponding to the wall portions 11, and the other wall portions making up the film-receiving trackway 42 and the illuminating shaft or passageway leading to the framing aperture 43. The arms 40a are arranged to removably and rotatably receive the usual winding reels 44, respectively, for motion picture film to be projected.

The mechanism for advancing such motion picture film intermittently is identical with that described above in connection with the editing device. Thus, it comprises a lever 45 and detent finger 46, corresponding to the lever and detent finger 22 and 23, respectively, of the editing device, together with appurtenant mounting and spring. It also includes rocker arms 47 and thereby carried guide spools 48, corresponding to the rocker arms 28 and guide spools 31, respectively, of the editing device. A lens assembly 49, suitable for film projection purposes, is hinged to the housing 40 in essentially the same manner as is the lens assembly 35 with respect to the housing 10 of the film editing device. As so arranged, it acts to lift the detent finger 46 by reason of abutment against the tail end 45a of the lever 45 when swung open, as explained above in connection with the film editing device.

As illustrated, the projector is preferably arranged for manual actuation by means of reel-rotating cranks 50. These may be made removable with respect to the arms 40a, so that the reels 44 may be easily changed.

The operation of the mechanism is identical with that of the editing device. As either one or the other of the reels 44 is manually rotated by its crank 50, the film at that side of the mechanism is tensioned, thereby actuating the rocker arm assembly in the manner afore-described and effecting the intermittent advance of the film at a speed determined by the rate at which the handle is turned.

Whereas this invention is here illustrated and described with respect to particular preferred embodiments thereof, it should be understood that various changes may be made without departing from the essential concepts here taught and the scope of the claims which here follow.

I claim:

1. Mechanism for intermittently advancing marginally perforated, motion picture film, comprising structure defining a film-receiving surface along which the film is to be moved for showing purposes, said surface having a raised and relatively narrow track portion for supporting a perforated margin of the film; a detent adapted to work in the perforations of the supported margin of the film, the track portion of said film-receiving surface being recessed opposite said detent to accomodate projection of the detent beyond the film; means mounting said detent for movement toward and away from said track, said means including a lever pivoted intermediate its length, the detent extending from one end of said lever; a spring operative on the end of said lever opposite the detent-carrying end thereof, for normally urging the detent toward said track; and film-operated mechanism for moving said detent away from said track upon the exercise of longitudinal pulling tension upon the film, said mechanism including a rocker arm rockably mounted intermediate its length adjacent and for abutting engagement with said lever so as to move the detent away from said track, resilient means normally urging the rocker arm away from said lever, and film-guiding means carried by respective opposite ends of said rocker arm so that said mechanism is operable in either direction of travel of the film.

2. The combination of claim 1 wherein the rocker arm mounting means comprises spaced walls upon which the rocker arm rests, and a stem rigid with and disposed intermediate the length of said rocker arm and extending between said walls; and wherein the resilient means is a tension spring attached to said stem and fixedly anchored with respect to said walls.

3. A machine for showing motion pictures, comprising a housing having mutually spaced wall portions in face-to-face opposition and a wall portion extending thereacross to provide a trackway surface adapted for traversal by motion picture film, said wall portion having a framing aperture within said surface; an elongate lever overhanging said surface; a detent at the overhang end of the lever; means pivoting said lever on an axis extending longitudinally of said trackway; resilient means biasing the lever toward said trackway, so that the detent is operably disposed with respect to the actuating perforations of motion picture film received by the trackway; a rocker arm extending transversely with respect to said spaced wall portions and said lever and projecting laterally therefrom, said rocker arm being mounted for rocking movement upon said wall portions and below but in actuating relationship with said lever and having a stem projecting between said wall portions; resilient means interconnecting said stem with said housing to yieldably anchor said rocker arm relative to motion picture film; and film-guiding spool means mounted on said rocker arm remote from said stem.

4. The combination of claim 3, wherein a lens assembly is hinged to the housing for swinging toward and away from the trackway surface; and wherein the lever is extended in a direction opposite the detent and into the path of swing of the lens assembly away from the trackway surface, whereby the detent is held away from the trackway surface when the lens assembly is swung open with respect to the housing.

References Cited in the file of this patent

UNITED STATES PATENTS

| | | |
|---|---|---|
| 1,023,797 | Batdorf | Apr. 23, 1912 |
| 1,742,796 | Underwood | Jan. 7, 1930 |
| 2,211,218 | Serrurier | Aug. 13, 1940 |
| 2,457,915 | Nemeth | Jan. 4, 1949 |

FOREIGN PATENTS

| | | |
|---|---|---|
| 683,460 | Germany | Nov. 7, 1939 |
| 964,319 | France | Jan. 25, 1950 |
| 632,363 | Great Britain | Nov. 28, 1949 |
| 643,390 | Great Britain | Sept. 20, 1950 |